United States Patent
Silverbrook

(10) Patent No.: US 6,425,651 B1
(45) Date of Patent: Jul. 30, 2002

(54) HIGH-DENSITY INKJET NOZZLE ARRAY FOR AN INKJET PRINTHEAD

(75) Inventor: Kia Silverbrook, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 0 days.

(21) Appl. No.: 09/966,291

(22) Filed: Sep. 28, 2001

Related U.S. Application Data

(63) Continuation-in-part of application No. 09/112,767, filed on Jul. 10, 1998, now Pat. No. 6,336,710.

(30) Foreign Application Priority Data

Jul. 15, 1997 (AU) .............................................. PO7991
Mar. 25, 1998 (AU) .............................................. PO2592

(51) Int. Cl.⁷ .............................. B41J 2/015; B41J 2/15; B41J 2/04
(52) U.S. Cl. ............................. 347/40; 347/20; 347/54
(58) Field of Search ............................ 347/20, 40, 44, 347/47, 54

(56) References Cited

U.S. PATENT DOCUMENTS 5,812,159 A * 9/1998 Anagnostopoulos et al. .. 347/55

FOREIGN PATENT DOCUMENTS

| EP | 0416540 A2 | * | 3/1991 | .................. | 347/68 |
| JP | 403292147 A | * | 12/1991 | .................. | 347/68 |

* cited by examiner

*Primary Examiner*—John Barlow
*Assistant Examiner*—An H. Do

(57) ABSTRACT

An inkjet printhead includes at least one support structure. A plurality of nozzle arrangements are positioned on the, or each, support structure. Each nozzle arrangement includes a nozzle chamber defining structure that is positioned on the substrate and that defines a nozzle chamber. The nozzle chamber defining structure includes a roof that defines an ink ejection port that is in fluid communication with the nozzle chamber. All the nozzle arrangements are positioned in an aligned, side-by-side manner on the, or each, support structure so that the ink ejection ports of the nozzle arrangements are positioned substantially rectilinearly along a length of the, or each, support structure. The nozzle arrangements are each dimensioned so that a distance between consecutive ink ejection ports is less than, or equal to, 42 microns.

17 Claims, 3 Drawing Sheets

HIGH-DENSITY INKJET NOZZLE ARRAY FOR AN INKJET PRINTHEAD

This is a C-I-P of U.S. Ser. No. 09/112,767 filed on Jul. 10, 1998 now U.S. Pat. No. 6,336,710.

STATEMENT REGARDING FEDERALLY SPONSORED RESEARCH OR DEVELOPMENT

Not Applicable

FIELD OF THE INVENTION

This invention relates to an inkjet printhead. More particularly, this invention relates to an inkjet printhead that includes a high-density array of nozzle arrangements.

REFERENCED PATENT APPLICATIONS

This application is a continuation-in-part application of U.S. application Ser. No. 09/112,764 now U.S. Pat. No. 6,336,710. The following U.S. Patent Nos. and U.S. Patent Application Nos. are hereby incorporated by reference:

| | | | | |
|---|---|---|---|---|
| 6,227,652 | 6,213,588 | 6,213,589 | 6,231,163 | 6,247,795 |
| 6,244,691 | 6,257,704 | 6,220,694 | 6,257,705 | 6,247,794 |
| 6,234,610 | 6,247,793 | 6,264,306 | 6,241,342 | 6,247,792 |
| 6,264,307 | 6,254,220 | 6,234,611 | 6,239,821 | 6,247,796 |
| 6,227,653 | 6,234,609 | 6,238,040 | 6,188,415 | 6,227,654 |
| 6,209,989 | 6,247,791 | 6,217,153 | 09/112,767 | 6,243,113 |
| 6,247,790 | 6,260,953 | 6,267,469 | 091113,122 | 09/112,793 |
| 09/112,794 | 09/113,128 | 09/113,127 | 09/112,807 | 09/425,419 |
| 09/425,418 | 09/425,194 | 09/425,193 | 09/422,892 | 09/112,808 |
| 09/112,809 | 09/112,778 | 09/113,083 | 09/113,099 | 09/112,764 |
| 09/422,806 | 09/425,420 | 09/422,893 | 09/693,703 | 09/693,706 |
| 09/693,313 | 09/693,279 | 09/693,727 | 09/693,708 | 09/575,141 |
| 09/113,053 | 09/855,094 | 09/854,762 | 09/854,715 | 09/854,830 |
| 09/854,714 | 09/854,703 | 09/855,093 | 09/854,815 | 09/854,825 |
| 09/864,377 | 09/864,380 | 09/900,178 | 09/864,379 | 09/864,378 |
| 09/864,334 | 09/864,332 | 09/864,343 | 09/864,342 | 09/866,786 |
| 09/874,757 | 09/900,174 | 09/900,160 | 09/900,175 | 09/900,177 |
| 09/900,159 | 09/900,176 | 09/922,274 | 09/922,275 | 09/922,158 |
| 09/922,159 | 09/922,036 | 09/922,047 | 09922,029 | 09/922,207 |
| 09/922,112 | 09/922,105 | 09/942,549 | 09/942,605 | 09/942,548 |
| 09/942,603 | 09942,604 | 09/575,108 | 09/575,109 | 09/575,110 |
| 09/607,985 | 09/607,990 | 09/607,196 | 09/606,999 | |

Some applications are temporarily identified by docket numbers. The docket numbers will be replaced by the corresponding USSN when available.

BACKGROUND OF THE INVENTION

As set out in the above referenced applications/patents, the Applicant has spent a substantial amount of time and effort in developing printheads that incorporate micro electro-mechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

Common to most of the printhead chips that the Applicant has developed is a component that moves with respect to a substrate to eject ink from a nozzle chamber. This component can be in the form of an ink-ejecting member that is displaceable in a nozzle chamber to eject the ink from the nozzle chamber. Instead, this component can be in the form of a structure that defines an ink ejection port and that is displaceable with respect to the substrate to reduce and subsequently enlarge a nozzle chamber so that a resultant fluctuation in ink pressure results in an ejection of ink from the nozzle chamber, through the ink ejection port.

The Applicant has managed to achieve the high resolution mentioned above by developing nozzle arrangements that are sufficiently small and suitably arranged on a wafer substrate so that, when each nozzle arrangement is actuated to eject a drop of ink, the required resolution is achieved.

As is described in the above referenced patents/patent applications, the printhead chips are the product of an integrated circuit fabrication process. As is well known in this field, a primary goal of chip manufacturers is to develop chips that use as little chip real estate as possible. The reason for this is that chip real estate is extremely expensive. It follows that it has also been a goal for the Applicant to achieve a printhead chip that uses a minimal amount of chip real estate. The above referenced matters include nozzle arrangements where the Applicant has succeeded in making substantial savings in chip real estate. Up until the present invention however, the Applicant has faced substantial difficulties in achieving the necessary high density of nozzle arrangements, while still saving real estate.

The Applicant has conceived the present invention to achieve a printhead chip that is configured so that a substantial saving in chip real estate can be made while still retaining a suitable nozzle density.

SUMMARY OF THE INVENTION

According to the invention, there is provided an inkjet printhead that comprises at least one support structure; and a plurality of nozzle arrangements that are positioned on the, or each, support structure, each nozzle arrangement including a nozzle chamber defining structure that is positioned on the substrate and that defines a nozzle chamber, the nozzle chamber defining. structure including a roof that defines an ink ejection port that is in fluid communication with the nozzle chamber, wherein all the nozzle arrangements are positioned in an aligned, side-by-side manner on the, or each, support structure so that the ink ejection ports of the nozzle arrangements are positioned substantially rectilinearly along a length of the, or each, support structure and the nozzle arrangements are each dimensioned so that a distance between consecutive ink ejection ports is less than or equal to 42 microns.

The invention is now described, by way of example, with reference to the accompanying drawings. The following description is not intended to limit the broad scope of the above summary.

DETAILED DESCRIPTION OF THE INVENTION

Figure 1:
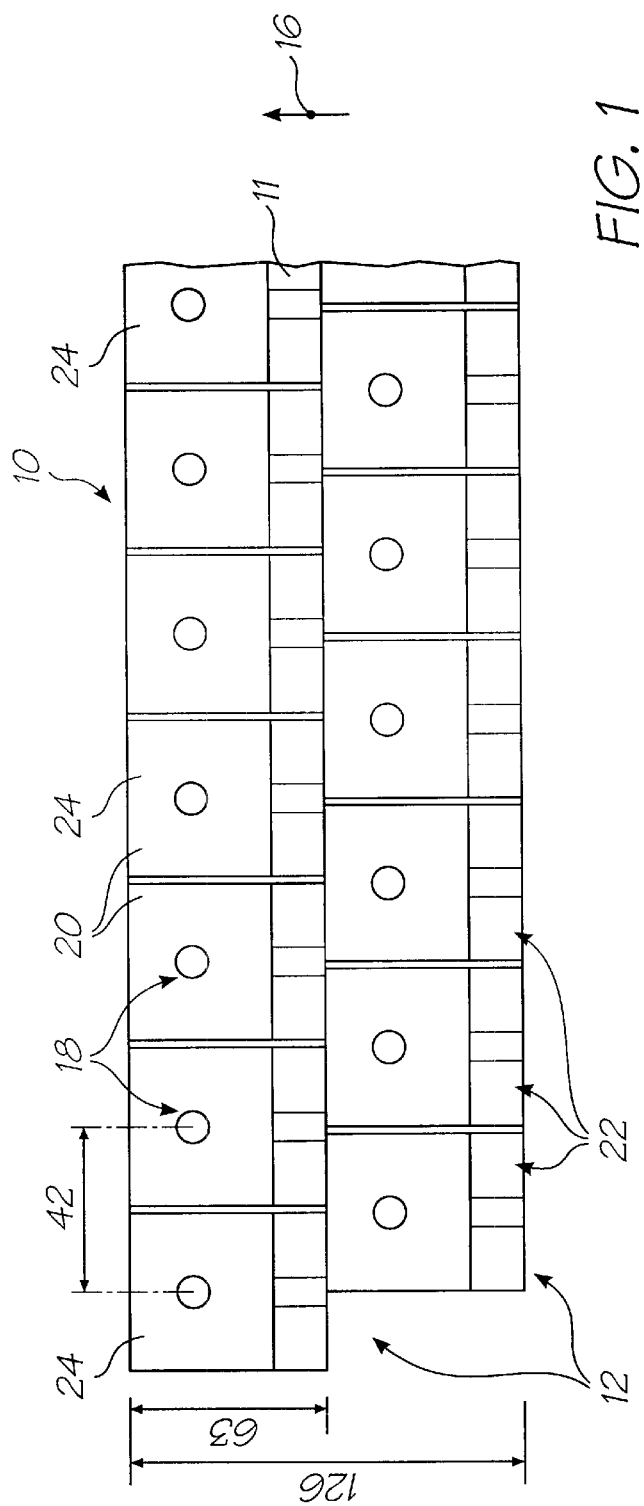
FIG. 1 shows a schematic plan view of a printhead chip developed by the Applicant.

In FIG. 1, reference numeral 10 generally indicates a schematic plan view of part of a printhead chip, showing a nozzle arrangement layout that the Applicant has used to achieve the necessary high resolution. The printhead chip 10 is not in accordance with this invention. The purpose of showing the printhead chip 10 is to illustrate the substantial chip real estate savings that are achieved with the present invention. This is best done by setting out a description of an embodiment of a printhead chip that has been developed by the Applicant. This embodiment is regarded as suitable in itself for achieving high resolutions. Applicant submits that this serves to emphasize the advantages of the present invention.

The chip 10 is capable of generating images with a resolution of up to 1200 dpi.

Each nozzle arrangement of the chip 10 is indicated at 12. The dimensions shown in the drawings are in microns. Thus, each nozzle arrangement 12 is generally rectangular and has a length of 63 microns.

The nozzle arrangements 12 are positioned in two rows 14 on a silicon wafer substrate 11 so that a distance between centers of consecutive ink ejection ports 18 is approximately 42 microns. The rows 14 are staggered with respect to each other. Thus, when a print medium moves relative to the chip 10 in the direction indicated by an arrow 16, an effective distance between ink drops ejected on to the print medium can be as little as 23 microns. This takes into account the fact a certain amount of clearance is required between consecutive nozzle arrangements 12.

It will be appreciated that a width of the printhead chip 10 is twice 63 microns, namely 126 microns. It follows that approximately 2650 microns squared of chip area (42 divided by 2 and multiplied by 126 and rounded to the nearest 10) is required in order to achieve a column of ink dots on the print medium.

Each nozzle arrangement 12 can readily be replaced by any of a number of the nozzle arrangements described in the above referenced applications/patents. Applicant submits that this would not alter the dimensions set out here to any significant extent.

This particular nozzle arrangement 12 has an active ink-ejecting member 20 that is positioned on a substrate and is connected to a thermal bend actuator 22 that drives the active ink-ejecting member towards and away from the substrate. This movement results in a fluctuation of ink pressure within a nozzle chamber defined by the active ink-ejecting member 20 and a resultant ejection of a drop of ink from the ink ejection port 18 defined in a roof 24 of the active ink-ejecting member 20. The thermal bend actuator 22 includes an actuator arm 26 that is of a conductive material and defines an active portion 30 and a passive portion 32. The active portion 30 defines a heating circuit that is connected to drive circuitry in the substrate with a pair of active anchors 28. The passive portion 32 is connected to the substrate with a pair of passive anchors 34.

Figure 2:
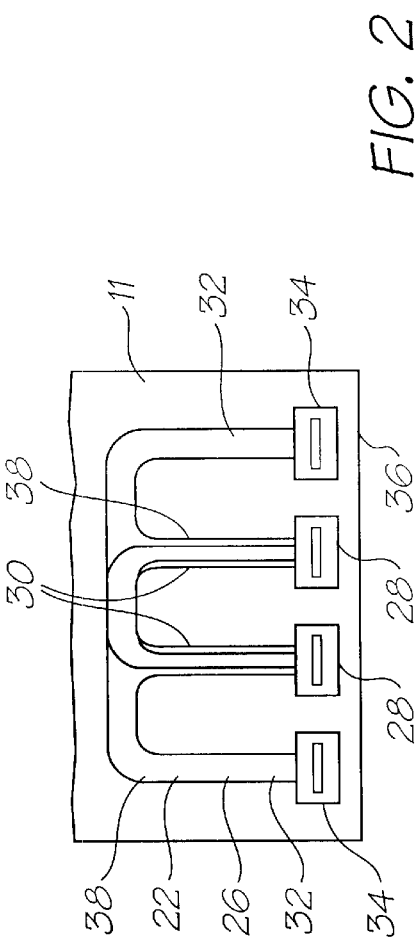
FIG. 2 shows a schematic plan view of a thermal bend actuator of a nozzle arrangement of the printhead chip of FIG. 1.

The anchors 28, 34 are aligned along a proximal end 36 of each nozzle arrangement 12. The active anchors 28 are positioned between the passive anchors 34. This is a convenient configuration since it permits the actuator arm 26 to have a simple structure. Simplicity of shape is important in integrated circuit fabrication because of the high cost involved per basic structure when manufacturing a mask set. It follows that an intuitive approach would be to simply align the anchors 28, 34 as shown in FIG. 2 so that the actuator arm includes four substantially identical elements 38.

The elements 38 of the active portion 30 are positioned further from the substrate 11 than the elements 38 of the passive portion 32. Thus, when the active portion 30 is heated, the actuator arm 26 experiences differential thermal expansion that causes the actuator arm 26 to bend towards the substrate 11. Thus, the active ink ejection member 20 is also driven towards the substrate 11. When the active portion 30 cools, the actuator arm returns to a quiescent condition causing the active ink ejection member 20 to be driven away from the substrate 11. This reciprocal movement of the active ink ejection member 20 results in a fluctuation of ink pressure within the nozzle chamber so that ink is ejected from the ink ejection port 18.

Figure 3:
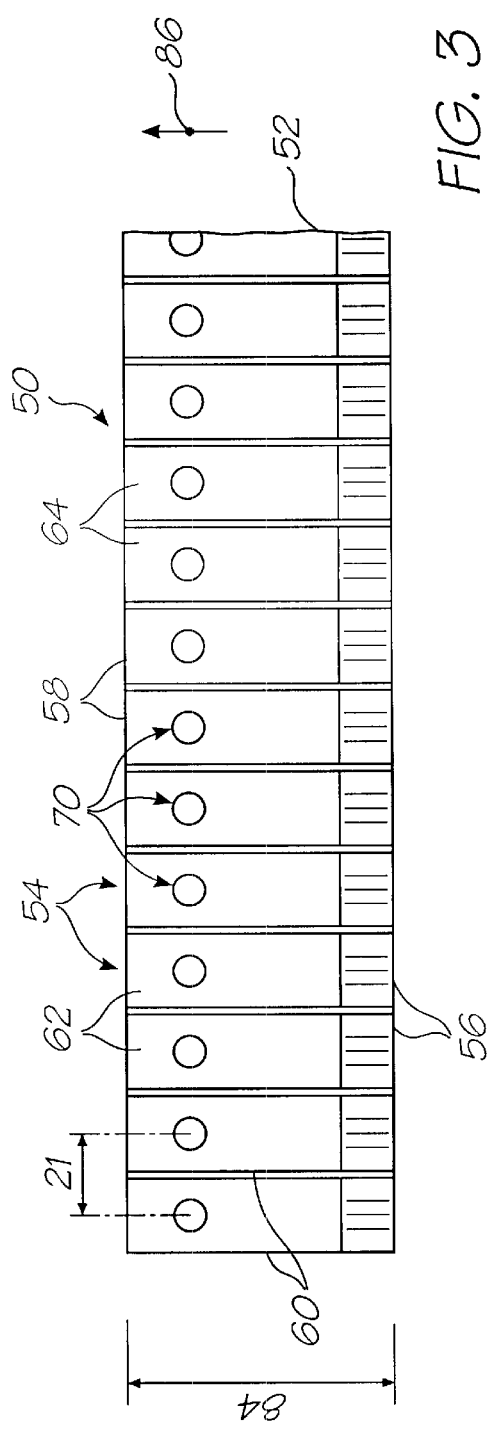
FIG. 3 shows a schematic plan view of a printhead chip, in accordance with the invention, for an inkjet printhead.

In FIG. 3, reference numeral 50 generally indicates a printhead chip, in accordance with the invention, for an ink jet printhead.

The printhead chip 50 includes an elongate wafer substrate 52. A plurality of nozzle arrangements 54 is positioned on the wafer substrate 52.

Figure 6:
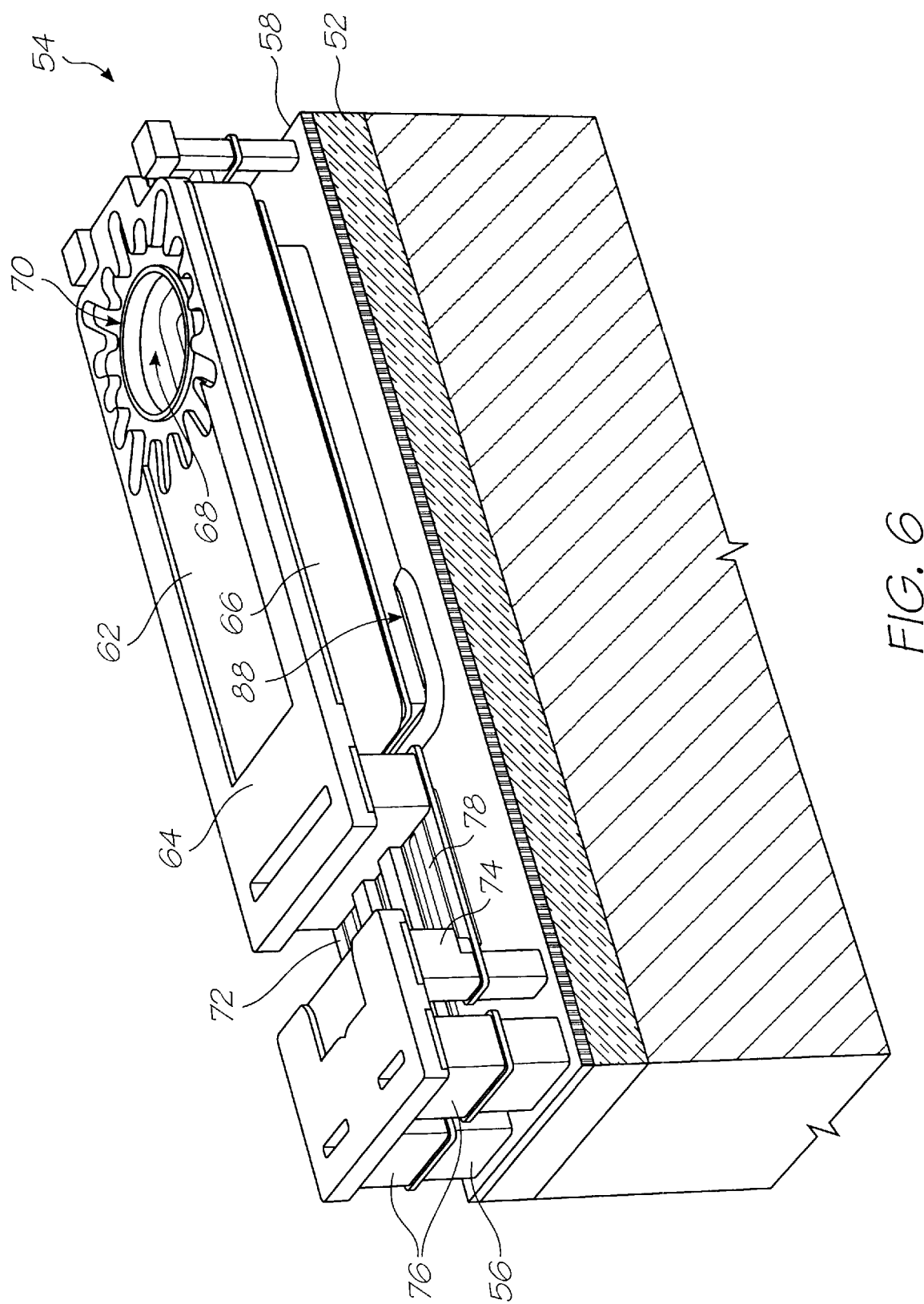
FIG. 6 shows a three dimensional view of a nozzle arrangement of the printhead chip of FIG. 3.

Each nozzle arrangement 54 is generally rectangular in plan view with a proximal end 56, a distal end 58 and a pair of opposed sides 60. Detail of one of the nozzle arrangements 54 is shown in FIG. 6.

Each nozzle arrangement 54 includes an active ink ejection member 62. The active ink ejection member 62 includes a roof 64 and sidewalls 66 that extend from the roof 64 towards the substrate 52 to define a nozzle chamber 68. The roof 64 defines an ink ejection port 70. The active ink ejection member 62 is displaceable towards and away from the substrate 52 so that a resultant fluctuation in ink pressure within the nozzle chamber 68 causes an ejection of an ink drop from the ink ejection port 70.

Each nozzle arrangement 54 includes a thermal bend actuator 72 that is connected to the active ink ejection member 62 to drive the active ink ejection member 62 towards and away from the substrate 52 to eject ink drops from the ink ejection port 70.

The thermal bend actuator 72 is connected to a number of anchor formations in the form of a pair of passive anchors 74 and a pair of active anchors 76. The pair of active anchors 76 are positioned adjacent the proximal end 56 of the nozzle arrangement 54. The active anchors 76 are in alignment with each other across a width of the nozzle arrangement 54. The pair of passive anchors 74 is interposed between the active anchors 76 and the active ink ejection member 62. The passive anchors 74 are in alignment with each other across a width of the nozzle arrangement 54. Further, each active anchor 76 is in alignment with a respective passive anchor 74 along a length of the nozzle arrangement 54.

The thermal bend actuator 72 includes an actuator arm 78 that extends from the anchors 74, 76 towards the active ink-ejecting member 62. The actuator arm 78 is of a conductive material that has a coefficient of thermal expansion that is such that the material is capable of expansion and contraction upon heating and subsequent cooling to an extent that is sufficient to allow the material to perform work on a MEMS scale.

The actuator arm 78 includes a pair of active portions 80 and a pair of passive portions 82. The active portions 80 are connected to the active anchors 76 while the passive portions 82 are connected to the passive anchors 74. The active anchors 76 are configured so that the active portions 80 make electrical contact with a CMOS layer positioned in the wafer substrate 52 through the active anchors 76. The portions 80, 82 are interconnected at distal ends with a bridging portion 84. Thus, the active portions 80 and part of the bridging portion 84 define an electrical heating circuit.

The actuator arm 78 is shaped so that the passive portions 82 are interposed between part of the active portions 80 and the substrate 52. It follows that, when the active portions 80 are heated as a result of a current passing through the active portions 80, the actuator arm 78 is bent towards the substrate 52 as a result of differential thermal expansion. Upon subsequent cooling of the active portions 80, the actuator arm 78 returns to a quiescent condition. This reciprocal movement of the actuator arm 78 serves to drive the active ink ejection member 62 towards and away from the substrate so that an ink drop is ejected from the ink ejection port 70.

The printhead chip 50 is configured to generate text and images having a resolution of 1200 dpi (dots per inch). Furthermore, as can be seen in FIG. 3, the nozzle arrangements 54 are arranged in an aligned, side-by-side manner so that the ink ejection ports 70 extend rectilinearly along a length of the substrate 52. It follows that a distance between consecutive ink ejection ports 70 is approximately 21 microns. It can therefore be deduced that a width of each nozzle arrangement 54 is also approximately 21 microns or slightly less, since clearance between consecutive nozzle arrangements 54 should be taken into account. A length of each nozzle arrangement is approximately 84 microns. It follows that, for a column of ink dots on a print medium moving in the direction of an arrow 86 shown in FIG. 3, 1770 microns square of chip real estate is required. As set out above, the printhead chip 10 requires 2650 microns square of chip real estate in order to achieve a column of ink dots. It follows that a cost saving of over 30 percent can be achieved with the printhead chip 50.

In order to achieve such a cost saving, the applicant has had a number of difficulties to address. These difficulties have made it counter-intuitive to design the printhead chip of this invention. These difficulties are primarily associated with the narrowness of the nozzle arrangement 50.

Figure 4:
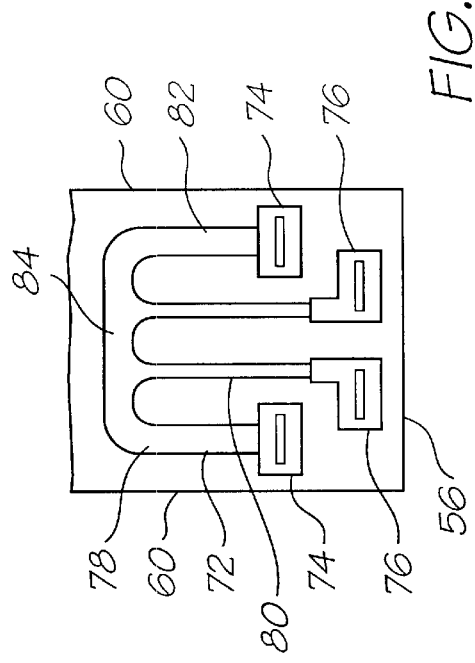
FIG. 4 shows a schematic plan view of a thermal bend actuator of a nozzle arrangement of the printhead chip of FIG. 3.

One of the significant difficulties is the anchor formation configuration. With the nozzle arrangement 12, the anchors 28, 34 are simply positioned in alignment with each other on the substrate 11. As set out above, this is a logical way of doing this since it simplifies the structure of the thermal actuator 22. However, this configuration would not be feasible with the nozzle arrangement 54. It follows that the Applicant has devised the configuration shown in FIGS. 4 and 6 in order to keep the nozzle arrangement 54 as narrow as possible.

Figure 5:
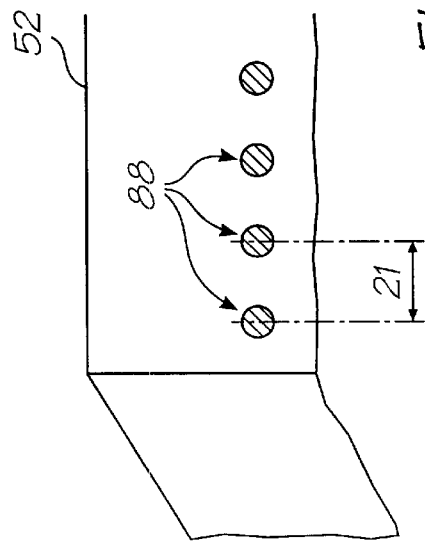
FIG. 5 shows a schematic view of a back surface of a wafer substrate of the printhead chip of FIG. 3.

Another difficulty which would make the configuration of FIG. 3 counter-intuitive is the fact that each nozzle arrangement is required to be fed with ink via an inlet channel 88 defined through the substrate 52 (FIG. 5). In general the wafer substrate 52 can be in the region of 300 microns thick. Considering the fact that each nozzle arrangement 54 is only in the region of 21 microns thick a person of ordinary skill in the art would appreciate that this presents an extremely difficult etching task. Applicant submits that the printhead chip 10 provides an opportunity for an etching task that is substantially easier due to the required larger spacing between consecutive ink inlet channels 88.

The Applicant has found that the nozzle arrangement 54 is particularly suited to accommodating the required dimensions. One of the reasons for this is that the nozzle chamber 68 has a length dimension that is over 3 times a height dimension. Furthermore, an opening of the ink inlet channel 88 is positioned adjacent a proximal end of the nozzle chamber 68 while the ink ejection port 70 is positioned proximate a distal end of the nozzle chamber 68. This configuration results in the displacement of the thermal actuator 72, as described above, being amplified at a distal end of the active ink-ejecting member 62, thereby facilitating efficient ink drop ejection. Furthermore, the relative dimensions of the nozzle chamber 68 retard a flow of ink from the ink ejection port 70 to the ink inlet channel 88 while the ink drop is ejected. This flow is known as backflow and is undesirable. It follows that the active ink-ejecting member 62 has a simple structure, since further components are not required to achieve these advantages. This is important when fabricating the nozzle arrangements 54 on the narrow scale of this invention.

The Applicant believes that this invention provides a means whereby a substantial saving in chip real estate can be made while not compromising required nozzle arrangement density.

I claim:

1. An inkjet printhead that comprises
   at least one support structure; and
   a plurality of nozzle arrangements that are positioned on the, or each, support structure, each nozzle arrangement including a nozzle chamber defining structure that is positioned on the substrate and that defines a nozzle chamber, the nozzle chamber defining structure including a roof that defines an ink ejection port that is in fluid communication with the nozzle chamber, wherein
   all the nozzle arrangements are positioned in an aligned, side-by-side manner on the, or each, support structure so that the ink ejection ports of the nozzle arrangements are positioned substantially rectilinearly along a length of the, or each, support structure and the nozzle arrangements are each dimensioned so that a distance between consecutive ink ejection ports is less than or equal to 42 microns.

2. An inkjet printhead as claimed in claim 1, which includes at least one printhead chip that incorporates a wafer substrate that defines the, or each, support structure, the nozzle arrangements being a product of an integrated circuit fabrication technique carried out on the wafer substrate.

3. An inkjet printhead as claimed in claim 2, in which each nozzle arrangement is in the form of a micro electro-mechanical structure.

4. An inkjet printhead as claimed in claim 3, in which the nozzle arrangements are each dimensioned so that a distance between consecutive ink ejection ports is less than or equal to 32 microns.

5. An inkjet printhead as claimed in claim 4, in which the nozzle arrangements are each dimensioned so that a distance between consecutive ink ejection ports is less than or equal to 22 microns.

6. An inkjet printhead as claimed in claim 5, in which each nozzle arrangement is generally rectangular when viewed in plan, having a width that is less than or equal to 22 microns and a length that is less than or equal to 65 microns, each nozzle arrangement having a proximal end, a distal end and a pair of opposed sides.

7. An inkjet printhead as claimed in claim 6, in which each nozzle chamber defining structure is in the form of an active ink ejection member having sidewalls and defining the roof, the active ink ejection member being displaceable towards and away from the substrate so that a subsequent fluctuation in ink pressure within the nozzle chamber results in the ejection of ink from the ink ejection port.

8. An inkjet printhead as claimed in claim 7, in which each nozzle arrangement includes an actuator that is connected to the active ink ejection member to displace the active ink ejection member towards and away from the substrate.

9. An inkjet printhead as claimed in claim 8, in which the actuator is in the form of a thermal bend actuator and each nozzle arrangement includes at least one anchor formation that is fast with the wafer substrate to extend from the wafer substrate, the thermal bend actuator being fixed to the, or each, anchor formation at a position spaced from the wafer substrate and connected to a CMOS layer on the wafer substrate with one or more anchor formations to receive electrical pulses from the CMOS layer.

10. An inkjet printhead as claimed in claim 9, in which each nozzle arrangement includes two or more anchor formations that are spaced from each other along a length of the nozzle arrangement to accommodate a width of the nozzle arrangement.

11. An inkjet printhead as claimed in claim 10, in which the thermal bend actuator includes an actuating arm that is connected between the anchor formations and the active ink ejection member, the actuating arm being defined by an active portion and a passive portion, the active portion defining an electrical heating circuit that is connected to the CMOS layer and the actuating arm including a bridging portion that interconnects the active and passive portions, the passive portions being positioned closer to the substrate than the active portions, the actuator arm being of a material that has a coefficient of thermal expansion which is such that, upon heating and subsequent cooling the material is capable of expansion and contraction to an extent sufficient to do work on a MEMS scale, so that, when the active portion is heated more than the passive portion, resultant differential expansion of the actuating arm causes the actuating arm to bend towards the substrate, thereby driving the active ink ejection member towards the substrate and when the active portion cools, resultant contraction of the active portion causes the actuating arm to return to a quiescent condition, thereby driving the active ink ejection member away from the substrate.

12. An ink jet printhead as claimed in claim 11, in which each nozzle arrangement includes a pair of passive anchor formations and a pair of active anchor formations, the pair of active anchor formations being positioned adjacent the proximal end of the nozzle arrangement and the pair of passive anchor formations being interposed between the active anchor formations and the active ink ejection member.

13. An inkjet printhead as claimed in claim 12, in which the pair of passive anchor formations and the pair of active anchor formations are positioned so that one passive anchor formation is aligned with a respective active anchor formation longitudinally with respect to the sides of the nozzle arrangement.

14. An inkjet printhead as claimed in claim 8, in which a plurality of ink inlet channels are defined through the substrate, each ink inlet channel opening into a corresponding nozzle chamber.

15. An inkjet printhead as claimed in claim 14, in which the sidewalls and roof of each nozzle chamber defining structure are such that a length of the nozzle chamber is at least three times a height of the nozzle chamber.

16. An inkjet printhead as claimed in claim 15, in which the actuator of each nozzle arrangement is connected to the active ink ejection member at a proximal end of the nozzle chamber, with the ink inlet channel being positioned adjacent a proximal end of the nozzle chamber and the ink ejection port being positioned adjacent a distal end of the nozzle chamber.

17. A printhead chip for an inkjet printhead, the printhead chip comprising a wafer substrate; and a plurality of nozzle arrangements that are positioned on the wafer substrate, each nozzle arrangement including a nozzle chamber defining structure that is positioned on the substrate and that defines a nozzle chamber, the nozzle chamber defining structure including a roof that defines an ink ejection port that is in fluid communication with the nozzle chamber, wherein all the nozzle arrangements are positioned in an aligned, side-by-side manner on the wafer substrate so that the ink ejection ports of the nozzle arrangements are positioned substantially rectilinearly along a length of the wafer substrate and the nozzle arrangements are each dimensioned so that a distance between consecutive ink ejection ports is less than or equal to 32 microns.

* * * * *